April 30, 1963
W. M. SIMS
3,087,708
ICE CREAM FREEZER ASSEMBLY
Filed May 29, 1959
5 Sheets—Sheet 1
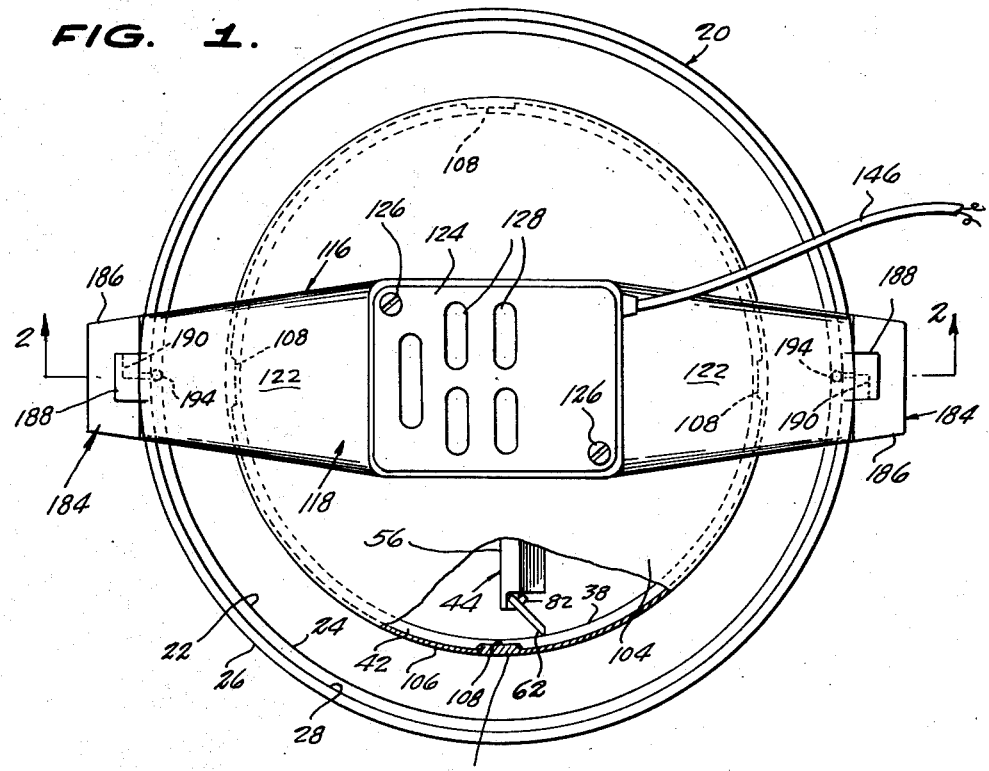
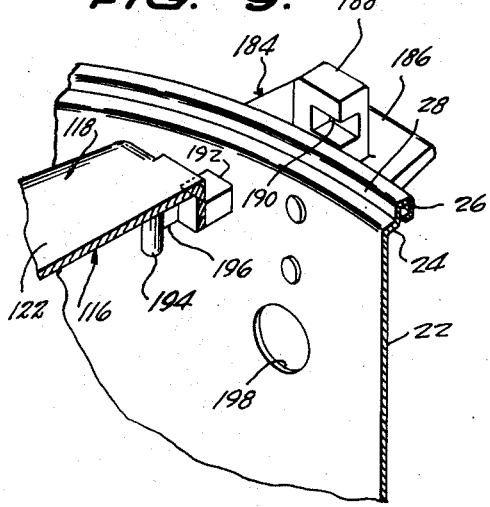
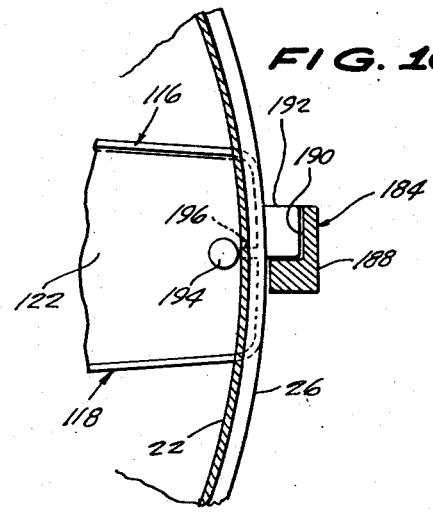
INVENTOR.
WALTER M. SIMS,
BY
McMorrow, Berman & Davidson
ATTORNEYS April 30, 1963  W. M. SIMS  3,087,708
ICE CREAM FREEZER ASSEMBLY
Filed May 29, 1959  5 Sheets-Sheet 2

INVENTOR.
WALTER M. SIMS,
BY
McMorrow, Berman + Davidson
ATTORNEYS.

April 30, 1963 W. M. SIMS 3,087,708
ICE CREAM FREEZER ASSEMBLY
Filed May 29, 1959 5 Sheets-Sheet 3

INVENTOR.
WALTER M. SIMS,
BY
McMorrow, Berman & Davidson
ATTORNEYS

April 30, 1963  W. M. SIMS  3,087,708
ICE CREAM FREEZER ASSEMBLY
Filed May 29, 1959  5 Sheets-Sheet 4
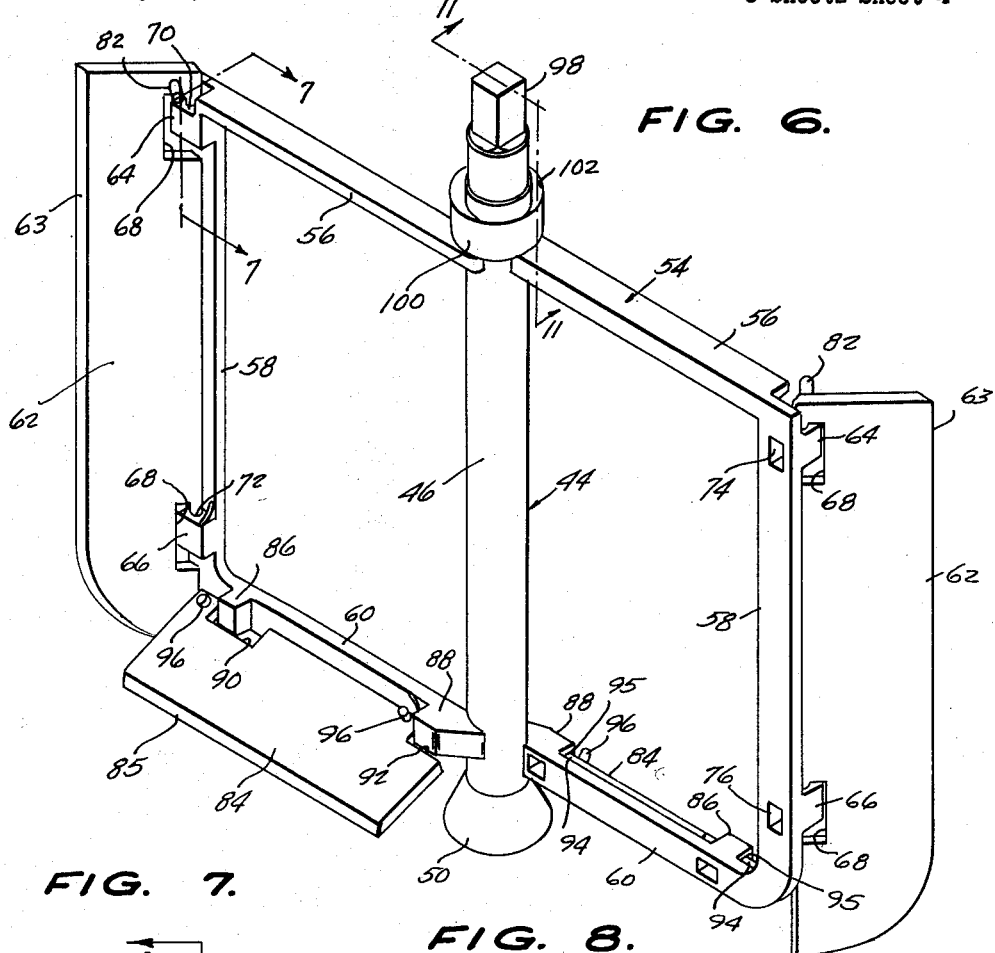
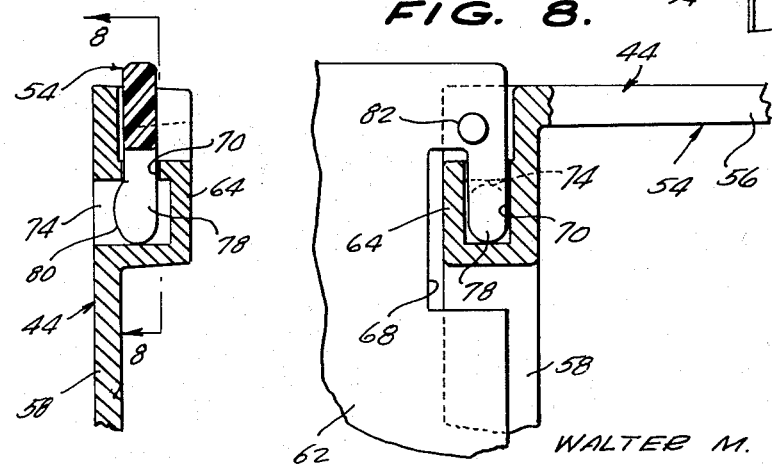
INVENTOR.
WALTER M. SIMS,
BY
McMorrow, Berman & Davidson
ATTORNEYS.

April 30, 1963 W. M. SIMS 3,087,708
ICE CREAM FREEZER ASSEMBLY
Filed May 29, 1959 5 Sheets-Sheet 5

INVENTOR.
WALTER M. SIMS,
BY
McMorrow, Berman & Davidson
ATTORNEYS.

United States Patent Office 3,087,708
Patented Apr. 30, 1963

3,087,708
ICE CREAM FREEZER ASSEMBLY
Walter M. Sims, 816 E. 23rd St., Little Rock, Ark.
Filed May 29, 1959, Ser. No. 816,878
1 Claim. (Cl. 259—53)

This invention relates generally to ice cream freezers of the type usable by the ordinary householder, it being understood that although the invention will be described with specific reference to its adaptability for making ice cream, it will be usable to advantage in making any of various other frozen confections, etc.

The present invention comprises an outer container having in a central position, on the bottom thereof, an upstanding, generally conically shaped pivot block, on which is rotatably supported an inner container adapted to hold the mix. In the space surrounding the inner container, ice is deposited, and bridging the outer container or bucket is a removable drive assembly. This includes a crosshead, at the ends of which are provided novelly designed latch elements cooperating with latch members on the outer container, to detachably, fixedly engage the crosshead with the outer container. Disposed medially between opposite ends of the crosshead is a housing, for a motor and speed reduction means. The speed reduction means is effective to drive a downwardly opening driving cup, separably, drivingly engaged with a complementary, upstanding portion of a lid of the inner container. Within the housing, there is provided a stationarily mounted, downwardly opening socket means, adapted to receive the complementarily shaped upper end of a paddle assembly disposed within the inner container, so as to hold said paddle assembly stationary. The paddle assembly, at its lower end, has a foot shaped complementarily to an upstanding portion of the bottom of the inner container.

By reason of the arrangement briefly summarized above, an operation of the motor, the inner container will be rotated at a comparatively slow, predetermined speed within the outer container, while the outer container and the paddle assembly remain stationary, thus to produce the ice cream.

In accordance with the invention, the outer container is of aluminum, with the inner container being of the same material. The particular arrangement is one in which the thermal conductivity characteristics are such as to provide for the making of the ice cream in a minimum amount of time. At the same time, the materials selected have obvious advantages as to their adaptability to be retained in a sanitary condition, lightness, etc.

Further, in accordance with the invention, the contacting, relatively rotatable components are so designed as to not only provide for silent operation, but also to provide for long life, minimum wear, and durability. To this end, in accordance with the invention, the foot of the paddle assembly, and the pivot block mounted in the outer bucket, are of a plastic material, in particular "nylon." The same material is employed for side and bottom flaps provided upon the paddle assembly.

Heretofore, it has been proposed to provide ice cream freezers wherein a mix-containing inner bucket is rotatable in respect to a paddle assembly and outer bucket, through the medium of a driving head carried by the outer bucket. Accordingly, the basic arrangement of the main components in this relationship being already known, it is one important object of the present invention to provide a generally improved assembly of this type.

Another important object is to provide an ice cream freezer assembly which will include an improved construction of the driving head, and of the cooperating portion of the inner container or bucket.

Another object is to form the driving head in such a manner as to facilitate manufacture, as well as its disassembly for the purpose of maintenance or repair.

Another object is to provide an improved driving connection between the driving head and the inner container, which connection will include a specially designed driving cup for the inner container, with said cup being engaged in its proper position by a stationary socket element which serves as a bearing for the driving cup while, at the same time, being adapted to engage the paddle assembly against rotatable movement.

Another object of importance is to provide an improved latching means between the outer container or bucket and the driving head, designed to facilitate the swift attachment or detachment of the driving head, with said latching means being designed, at the same time, to insure that the driving head will be firmly held against movement from its assigned position when it is in use.

A further object of importance is to provide an improved pivot means for the inner container, in an arrangement such that there will be pivot blocks in engagement with opposite faces of the bottom wall of the inner container, designed to hold the inner container against displacement from its assigned position, said pivot blocks being carried by the paddle assembly and by the outer bucket respectively. It is proposed, in this regard, that responsive to engagement of the paddle assembly in the socket element provided for in the driving head, all the components will be firmly engaged against both lateral and axial displacement, during the operation of the device.

Yet another object is to provide a paddle assembly which, in and of itself, will be of improved construction, due to a particular formation and relative arrangement of side and bottom flaps thereof.

Another object is to provide a paddle assembly wherein the side and bottom flaps will be of a plastic material, and will be adapted for attachment to a supporting frame of metal, the flaps being designed to permit their swift attachment to the supporting frame, during the manufacture of the device.

Another object of importance is to incorporate in the paddle assembly, at the lower end thereof, a specially designed foot, which is shaped to provide a bearing for the inner container, cooperating with a bearing disposed below the inner container in such a way as to cause automatic centering of the inner container relative to the outer container or bucket, as well as automatic centering of the paddle assembly within the inner container.

A further object of importance is to mount the flaps upon the frame of the paddle assembly in such a way as to permit their pivotal movement through predetermined angular distances, with the pivotal connections being so designed as to facilitate cleaning of the paddle assembly after use, with maximum ease and efficiency.

Yet another object of importance is to provide, for an ice cream freezer of the character described, a means carried by the paddle assembly designed to efficiently catch any drippings of lubricant that may tend to move downwardly from the motor during the operation of the device, with said means being in the form of a cup-like element extending about the shaft of the paddle assembly and proportioned relative to the shaft-receiving opening of the inner container lid in such a way as to prevent the lubricant from passing the oil cup.

Other objects are to provide a compact freezer that will operate with maximum efficiency, while still being capable of manufacture at relatively low cost considering the capacity and functional characteristics thereof; to facilitate the cleaning of the device; to produce a firm product in a minimum amount of time and with the least amount of ice considering the capacity of the device; and to facilitate the replacement of individual components whenever necessary, without requirement of discarding the remaining components of the device.

Other objects will appear from the following description, the claims appended thereto, and from the annexed drawings, in which like reference characters designate like parts throughout the several views, and wherein:

FIGURE 1 is a top plan view of an ice cream freezer according to the present invention, in which the inner container is shown partially in section;

FIGURE 6 is an enlarged perspective view of the paddle assembly or dasher, per se;

FIGURE 7 is a still further enlarged, detail sectional view through one of the pivotal connections provided in the paddle assembly, taken substantially on line 7—7 of FIGURE 6;

FIGURE 8 is a sectional view on the same scale as FIGURE 7, illustrating the pivotal connection and taken substantially on line 8—8 of FIGURE 7;

FIGURE 9 is a fragmentary, enlarged, exploded perspective view illustrating the cooperating latch means of the outer container and driving head;

FIGURE 10 is a fragmentary, enlarged horizontal section taken substantially on line 10—10 of FIGURE 2, showing the latch means of FIGURE 9 in their engaged positions;

Figure 2:
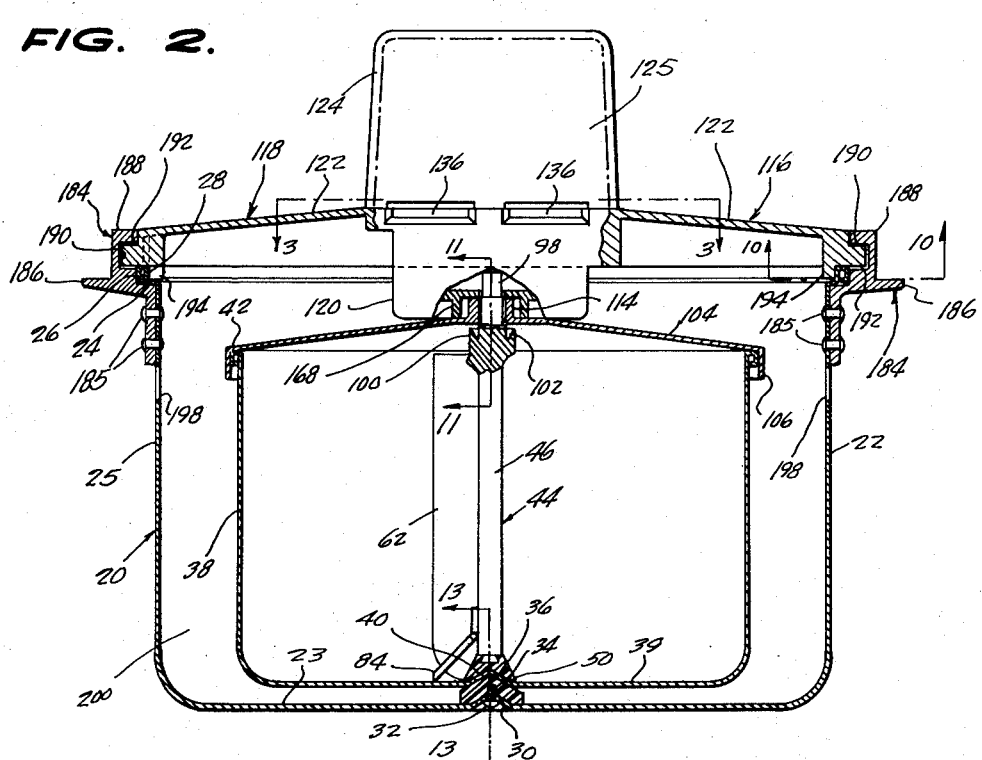
FIGURE 2 is a sectional view taken diametrically through the freezer, substantially on line 2—2 of FIGURE 1.

Referring to the drawings in detail, at 20 I have generally designated the ice cream freezer assembly constituting the present invention.

Assembly 20 includes an outer container or bucket 22. This, in a preferred, illustrated embodiment, is of aluminum material, said material being selected by reason of its adaptability to be easily maintained in a sanitary condition, its lightness, and its desirable characteristics as regards thermal conductivity and reflection.

The outer container 22, in the preferred embodiment illustrated, is provided with a substantially flat bottom wall 23, and with a side wall 25 which is of constant diameter for substantially its entire length. Side wall 25, at its upper end, is integrally formed with an outwardly directed, circumferentially extending flange 24 on the outer edge of which there is integrally formed a rolled lip or bead 26 cooperating with the flange 24 in defining a circumferential recess 28 opening inwardly of the outer container.

Integrally formed on the bottom wall 23, centrally thereof, is a low boss 30, centrally apertured to receive an upwardly projecting connecting screw 32, which is threadedly engaged in a pivot block 34 formed of "nylon" material in a preferred embodiment, said block having a conically-shaped top surface 36 constituting a bearing surface in a manner to be described in fuller detail hereinafter.

Figure 14:
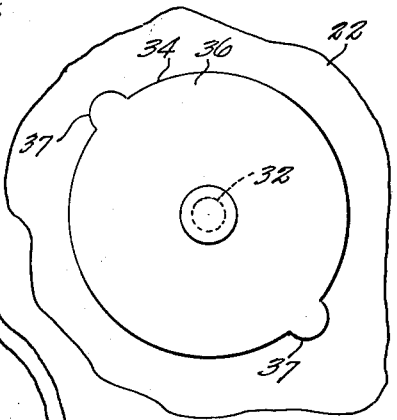
FIGURE 14 is a fragmentary plan view of the outer container showing the pivot block thereof, on the same scale as FIGURE 13.

Referring to FIGURE 14, the pivot block 34 is integrally formed at diametrically opposite locations with lugs 37, which are used to facilitate the holding of the block against rotation while the screw 32 is being threaded thereinto.

An inner container 38 is substantially smaller in diameter than the outer container, and in addition, is appreciably lower than the outer container. The inner container 38 has a bottom wall 39 spaced upwardly from the bottom wall 23, by the pivot block 34.

Figure 13:
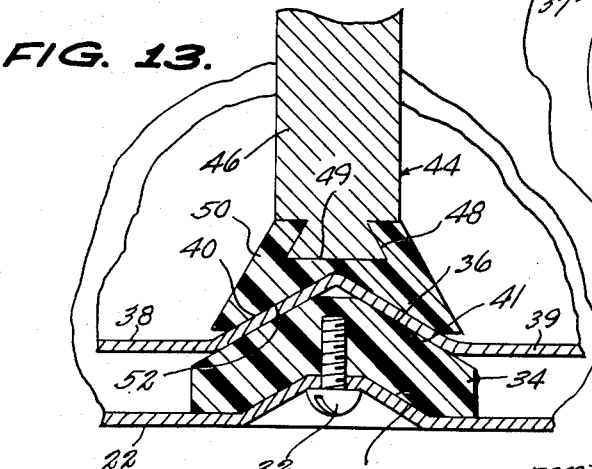
FIGURE 13 is an enlarged sectional view taken on line 13—13 of FIGURE 2, showing the pivot assembly on a scale enlarged substantially above that of FIGURE 2.

Bottom wall 39 is centrally formed with an upwardly-directed, conically-shaped bearing portion 40, defining a correspondingly conical, downwardly opening indentation 41 (FIGURE 13) in the bottom wall 39 of the inner container. The indentation 41 mates with the conically-shaped bearing surface 36 of the pivot block 34, thus providing for self-centering of the inner container within the outer container, while, at the same time, providing a bearing at the lower end of the inner container on which the same may rotate when the device is in use.

The inner container 38 is formed, at the upper end of its side wall, with an outwardly rolled bead or lip 42, and as will be noted, the beaded upper end of the inner container is spaced well downwardly from the plane of the top edge of the outer container.

The paddle assembly or dasher 44 of the device will now be described, and is shown per se in FIGURE 6. The paddle assembly includes a center post 46, of a light, strong metal material. The lower end of the center post 46 (see FIGURE 13) is integrally formed with a downwardly projecting undercut axial projection 48, embedded in a complementarily-shaped top recess 49 of a foot 50 of exteriorly frusto-conical shape, formed of a "nylon" material in a preferred embodiment. The foot 50 is formed, at its lower end, with a shallowly conical recess 52 shaped to receive the correspondingly formed, upwardly projecting bearing portion 40 of the inner container.

In this way, the bearing portion 40 is engaged between the foot 50 and the pivot block 34, both of which are of the mentioned "nylon" material. The arrangement is such as to cause the inner container to be automatically centered in respect to and supported for rotation upon the outer container, while, at the same time, being automatically centered in respect to the paddle assembly. Still further, the inner container is rotatable in respect to the paddle assembly, since the paddle assembly is designed to remain stationary when the device is in use.

The bearing means 50, 34 of the paddle assembly and outer container, accordingly, cooperate in centering and rotatably supporting the inner container, in its assigned use position within the outer container shown in FIGURE 2.

The paddle assembly includes a generally rectangular frame 54, integral with the center post and projecting in opposite directions from the center post. At one side of the center post, the frame is offset transversely from the portion of the frame that is disposed at the opposite side. This is shown to particular advantage in FIGURES 6 and 12.

The frame 54, thus, includes relatively transversely offset, horizontal upper frame portions or arms 56, integral at their outer ends with vertically disposed side frame portions 58. These are, in turn, made integral at their lower ends, with horizontal lower arms 60, offset correspondingly to the arms 56 provided at the upper end of the frame.

Referring to FIGURE 6, the paddle assembly includes a pair of oppositely directed side flaps 62, the outer longitudinal edges 63 of which are beveled so as to be disposed in wiping contact with the inner surface of the inner container. In this way, during rotation of the inner container the beveled cutting edges of the flaps 62 will cut the mix away from the wall of the inner container during the freezing process.

The flaps 62 are of "nylon," and may have a slight deformability or yielding characteristic, so as to facilitate their assembly with the rigidly constituted metal frame. Further, the slight deformability of the flaps 62 permits the flaps to yield slightly, upon encountering anything, during the use of the device, that is excessively resistant to dislodgment by the blades or flaps.

The flaps 62 are pivotally supported on upper and lower bearing lugs 64, 66 integrally formed upon the side portions 58 of the frame 54.

The bearing lugs extend into clearance recesses 68 formed in the inner longitudinal edges of the respective blades or flaps 62 (see FIGURE 8), and formed in the respective lugs 64, 66 are upwardly opening bearing recesses or sockets 70, 72 communicating with back openings 74, 76 of the respective upper and lower bearing lugs.

Integrally formed upon the inner longitudinal edge portions of the respective flaps 62, within the recesses 68 thereof, are depending bearing fingers 78, loosely, rotatably engaged in the sockets 70, 72 and formed, within the sockets, with enlarged lower end portions 80 (see FIGURE 7).

By reason of this arrangement, rotation of the fingers through a full 360 degrees within the openings may be prevented, and in addition, the accidental elevation of the flaps 62 out of the bearing means provided on the frame 54 is effectively obviated.

As shown to particular advantage in FIGURE 6, integrally formed upon the upper end portions of the respective flaps 62 are lugs 82, which project forwardly from the flaps 62 in the sense of the direction of the paddle assembly during the normal use of the device.

The lugs 82 constitute stop elements, which limit the pivotal movement of the flaps in one direction about their pivot axes, beyond a predetermined, retracted position.

Of course, the flaps will tend to move to their operative positions in wiping contact with the wall of the inner container, responsive to the pressure of the mix against the flaps during the rotational movement of the inner container. As the mix thickens during the freezing action, the pressure thereof against the flaps tends to increase, thus holding the flaps in even more intimate wiping contact with the wall of the inner container than is true at the beginning of the ice cream making operation.

The provision of the stop lugs 82 is designed to limit the swinging of the flaps beyond a predetermined, inoperative position. In this inoperative position, the flaps will be so disposed as to be automatically located where they will receive pressure from the mix, at the beginning of the ice cream making operation. As a result, the flaps will be automatically forced from their inoperative to their operative positions, responsive to starting of the rotational movement of the inner container during use of the device.

The paddle assembly also includes a pair of identical, but opposite bottom flaps 84, disposed at opposite sides of the general plane of the frame 54. The bottom flaps 84 are also of "nylon" material, and are in the form of generally rectangular, wide, flat blades having beveled outer longitudinal edges 85.

The blades 84 decline in a direction outwardly from the frame, in position such that on rotation of the inner container tending to direct the relatively viscous mix against the bottom flaps, said mix will exert pressure against the bottom flaps causing the same to swing downwardly into full wiping contact with the bottom wall of the inner container. In this way, the mix, as it tends to freeze upon the bottom wall, is scraped therefrom by the bottom flaps in the same manner that the mix is scraped by the side flaps from the side wall of the inner container.

The bottom flaps 84 are supported by lugs 86, 88 integrally formed upon the lower arms 60 of frame 54. The inner longitudinal edge portions of the bottom flaps are formed with clearance recesses 90, 92 for the lugs 86, 88 respectively, and fingers 94 are integrally formed upon the bottom flaps, within the recesses 90, 92, extending into bearing recesses 95 formed in one side of the bearing lugs 86, 88.

Small stop lugs 96 are integrally formed upon and are spaced longitudinally of the respective bottom flaps, said stop lugs projecting upwardly so as to limit the upward swinging movement of the bottom flaps by engaging the frame 54. The bottom flaps are held against upward swinging movement beyond a predetermined, inoperative position thereof, in which position the bottom flaps will still decline slightly in a direction outwardly from the frame. As a result, whenever the bottom flaps tend to swing upwardly, they will still be retained in positions such that the mix will impinge thereupon during the rotational movement of the inner container. Pressure is thus exerted against the bottom flaps tending to shift the same to their lower, working positions in wiping contact with the bottom wall of the inner container.

Figure 4:
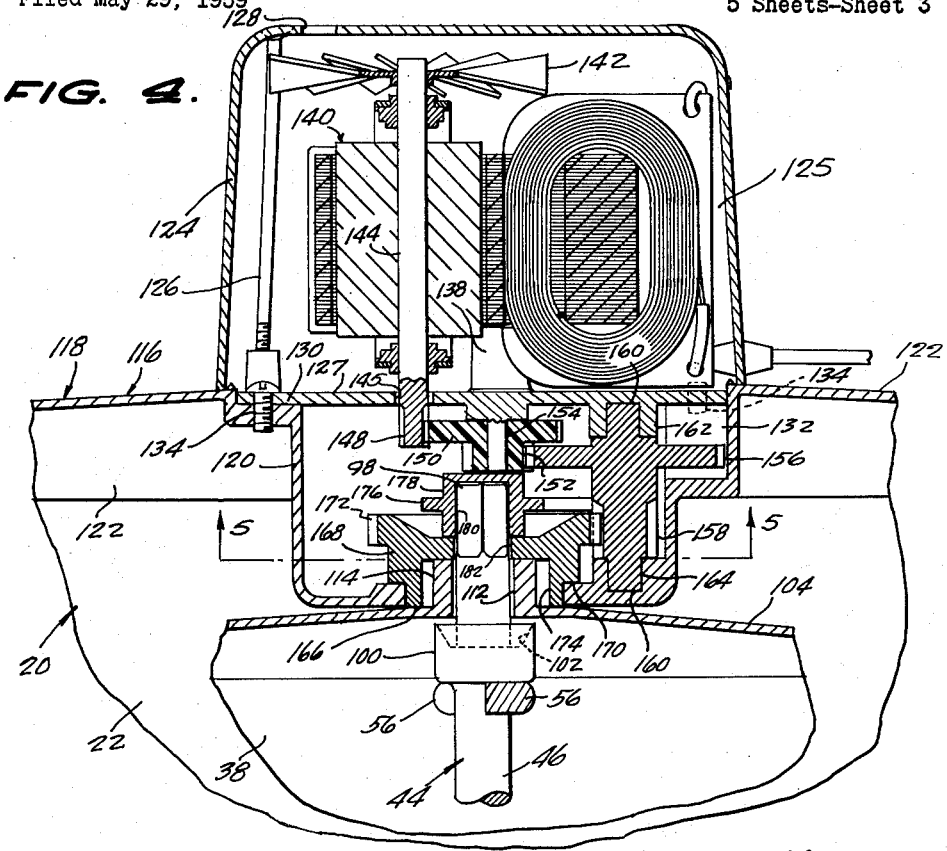
FIGURE 4 is a fragmentary longitudinal sectional view through the driving head, taken substantially on line 4—4 of FIGURE 3, on the same scale as FIGURE 3.
Figure 11:
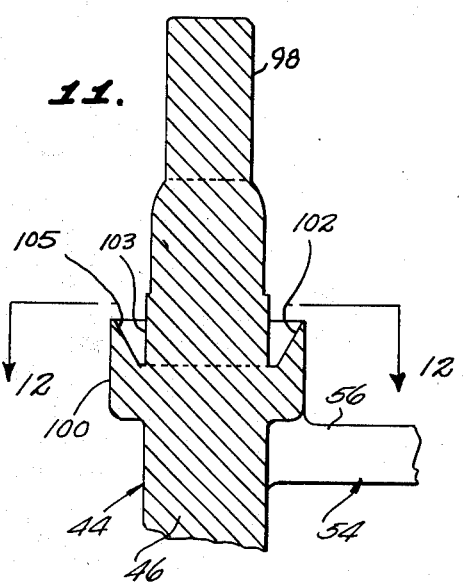
FIGURE 11 is a longitudinal sectional view through the upper portion of the paddle assembly, on line 11—11 of FIGURE 6.

Referring now to FIGURES 4, 6, and 11, integrally formed upon the upper end of the center post is an axial extension 98 of said center post, having a square cross sectional configuration in a preferred embodiment, although other non-circular cross sectional shapes can be employed to advantage. The base of the extension 98 is spaced upwardly a short distance from an annular cup 100, constituting a catcher for drippings of lubricant, that may tend to travel downwardly along the center post, from the driving head of the device.

Figure 12:
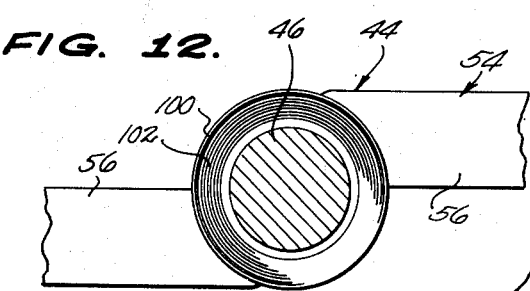
FIGURE 12 is a transverse sectional view through the paddle assembly center post, on the same scale as FIGURE 11, taken on line 12—12 of FIGURE 11.

As will be noted from FIGURES 11 and 12, the catcher or oil cup 100 has, in its top surface, a deep, continuous trough 102 extending over its full circumference, said trough having a vertical inner wall surface 103 and having a sloped outer wall surface 105, sloping in a direction downwardly from the periphery of the trough. As a result, any lubricant passing into the cup is caused to travel to the base of the slope, so as to be retained in an area whereby the maximum concentration of lubricant will be disposed immediately adjacent the circumference of the center post proper.

Provided upon the inner container is a removable lid or cover plate 104, which, as shown in FIGURE 2, is formed with a depending peripheral skirt or flange 106. Flange 106 is in engagement with the rolled lip 42, and as shown in FIGURE 1, formed on the inner surface of flange 106 are circumferentially extended, rib-like abutments 108. These are angularly spaced 90 degrees apart about the circumference of the lid, as shown in FIGURE 1, in a preferred embodiment, and are adapted to engage in complementary, outwardly opening, elongated recesses 110 defined in the rolled lip 42 of the inner container by flattening of said lip at locations angularly spaced 90 degrees apart.

By reason of this arrangement, the lid or cover may be moved vertically downwardly to a position closing the inner container (see FIGURE 2). The abutments 108 are, of course, aligned with the recesses 110 to permit the downward movement of the lid to its container-closing position. When the lid is in its FIGURE 1 position, it will be held against rotation in respect to the inner container. Therefore, on rotating of the lid by a drive mechanism to be described hereinafter, the inner container is caused to rotate therewith.

Formed in the lid 104 is a circular center hole 112, about which extends an upwardly projecting, exteriorly non-circular neck 114. In a preferred embodiment, the neck 114 is of square external configuration.

It is appropriate, now, to describe the driving means of the device. This constitutes a driving head 116 which is a unitary assembly bodily removable from the outer container when the device is not in use.

The driving head 116 includes a crosshead generally designated at 118, integrally formed intermediate its ends with a depending, upwardly opening support cup 120.

Figure 5:
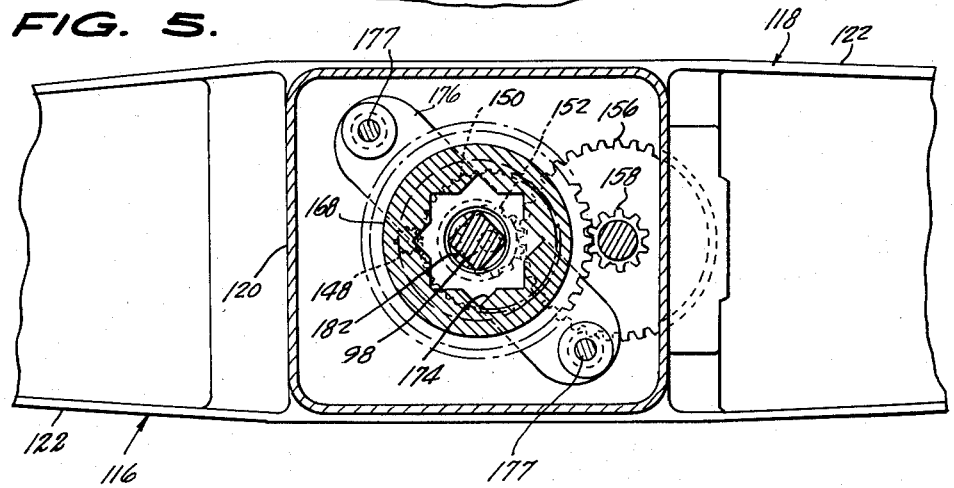
FIGURE 5 is a horizontal section through the driving linkage disposed between the motor and the inner container, taken substantially on line 5—5 of FIGURE 4 on the same scale as FIGURE 4.

The crosshead includes a pair of end portions 122, the top surfaces of which slope downwardly in a direction toward the outer circumference of the freezer, and as will be noted from FIGURES 4 and 5, the end portions 122 are in the form of downwardly opening channels, thus providing lightness, while, at the same time, assuring maximum strength.

Designated at 124 is a removable motor cover, cooperating with the support cup 120 in defining a housing 125 for the motor and for the various components of the driving linkage (see FIGURE 4).

Diagonally aligned, elongated connecting screws 126 (see FIGURE 4) are employed to connect the motor cover 124 to a horizontally disposed support plate 127 extending as a partition across the housing. On removal of the screws 126, the cover 124 is adapted to be lifted off, to expose the motor for maintenance or repair.

Referring to FIGURE 1, the top wall of the motor cover is formed with a plurality of vents 128, through which air may be directed during operation of the motor, for cooling purposes.

Figure 3:
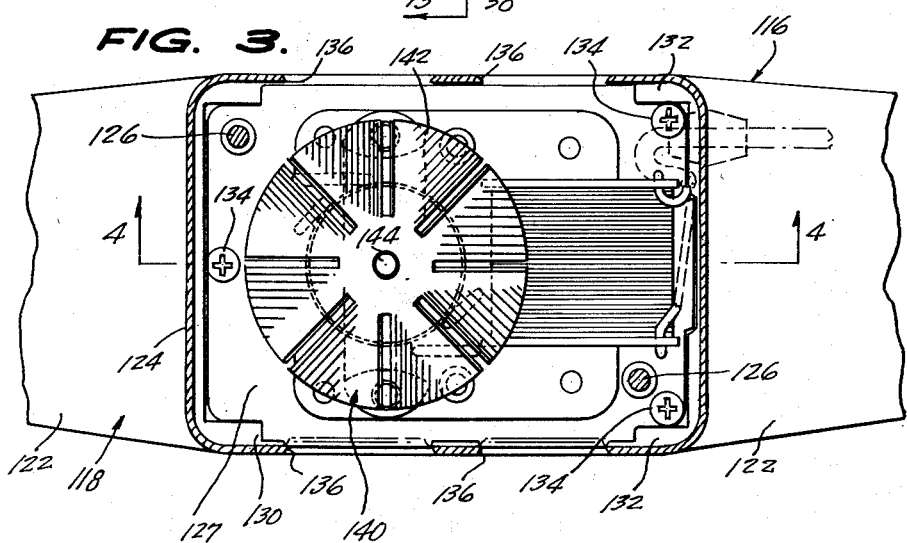
FIGURE 3 is a horizontal section, on an enlarged scale, taken through the central portion of the driving head.

Referring to FIGURES 3 and 4, integrally formed upon the crosshead, at one end of the support cup 120, is a transverse supporting ledge 130. At the other end of the support cup, there are corner ledges 132, and in the preferred embodiment, the base or support plate 127 is positioned upon the ledges 130, 132, and is fixedly secured through the provision of screws 134 extending into threaded openings provided in the ledges (see FIGURE 3).

At the base of the cover 124, elongated vents 136 are formed in the support cup, and thus, on operation of the motor, the rotation of a cooling fan carried by the motor will cause air to be drawn through the motor compartment of the housing, said air passing through the vents 128, 136 to cool the motor.

Mounted upon upwardly projecting motor support posts 138 secured to the base plate 127 is a conventional electric motor 140, having the usual cooling fan 142. The shaft 144 of the motor carries the fan 142 at its upper end, with the lower end of the shaft extending through an opening 145 formed in the plate 127.

Power is supplied to the motor through a convenience cord 146, which, of course, would have the usual plug for connecting the same to the ordinary house supply of electricity.

Formed upon the lower extremity of the shaft 144 is a small diameter driving pinion 148, meshing with a large diameter gear 150 that is integral with a small diameter gear 152. Gears 150, 152 are formed of a "nylon" material, thus providing for minimum gear noise during the operation of the device.

The smaller gear 152 is in mesh with a large diameter gear 156, integral with a small diameter gear 158, and with bearing projections 160 journaled in aligned bearings 162, 164 provided on the plate 127 and support cup 120 respectively.

The bottom wall of the support cup has a center-opening 166, of circular form, receiving the lower end of a downwardly opening drive cup 168 having intermediate its ends an external shoulder 170 bearing against the bottom wall of the support cup 120. The driving cup 168 is formed, at its upper end, with a large diameter gear member 172 in mesh with the gear 158.

It will be seen that the several gears constitute a speed reduction type driving mechanism between the motor and the driving cup, whereby the driving cup is caused to rotate at a predetermined, relatively slow speed during operation of the motor.

The driving cup is formed with a downwardly opening drive socket 174. This is shown to particular advantage in FIGURE 5, in which it will be seen that the driving socket is of non-circular shape, having a total of eight angular recesses, so arranged that any group of alternating recesses is adapted to complement and receive the square neck 114 formed upon the lid 104.

Designated at 176 is a horizontally disposed bridging element extending across the top surface of the drive cup 168. Said bridging element thus engages the drive cup against movement upwardly from its assigned position shown in FIGURE 4. The bridging element 176, at its opposite ends, is fixedly mounted upon support legs 177, and integrally formed upon the mid-length portion of the element 176 is a boss 178, having a downwardly opening, square socket 180 mating with the extension 98 of the paddle assembly. A circular center opening 182 is formed in the driving cup, the extension 98 projecting therethrough in the manner shown to best advantage in FIGURE 5.

It is appropriate now to consider the latching means, whereby the driving head is removably secured to the outer container. Said latching means has been generally designated at 184, and is shown to best advantage, it is believed, in FIGURES 1, 9, and 10.

Through the provision of rivets 185 (see FIGURE 2) or equivalent fastening elements, angularly shaped support brackets 186 are fixedly secured to the side wall of the outer container, at diametrically opposite locations thereon. Integrally formed upon the top surfaces of the brackets 186 are upstanding locking lugs 188, each locking lug having a laterally and inwardly opening locking recess 190. The locking recess of one lug extends oppositely to the locking recess of the other lug, as clearly shown in FIGURE 1.

Integrally formed upon the opposite ends of the crosshead 118 are latch elements 192, shaped to move into and lockably engage within the recesses 190.

As shown in FIGURES 9 and 10, inwardly a short distance from the lugs 192 the end portions of the crosshead are formed with depending, cylindrically-shaped guide projections 194, reinforced against breakage by a connecting web 196. The projections 194 are centered between the opposite sides of the crosshead, as shown in FIGURE 1, and are so disposed as to ride in the circumferential recess 28 (FIGURE 9) of the outer container. This is shown to advantage in FIGURE 2, and it will be seen that assuming one were to desire to mount the driving head upon the outer container, it is merely necessary to position the driving head upon the outer container, with the guide projections 194 dropping into the recess 28. Then, the driving head is rotated, sliding upon the recessed top edge portion of the side wall of the outer container, until the lugs 192 enter the recesses 190.

Preferably, the arrangement is such as to require that the lugs 192 be forced into the recesses 190 by reason of being slightly oversize with respect to the recesses in one typical embodiment. In this way, a strong frictional engagement is set up between the lugs 192 and the contacting surfaces of the recesses 190, designed to insure against the crosshead becoming detached accidentally from the outer container due to vibrations that may occur in the normal operation of the device.

Downwardly from the brackets 186, the outer container is formed with openings 198, located immediately below the lid 104. The openings 198 provide for drainage of liquid out of the outer container, during melting of the ice deposited therein, so that said liquid will not tend to find its way into the interior of the inner container.

In use of the device, initially the driving head, outer container, inner container, lid 104, and paddle assembly 44, are all completely separated from one another. The user makes up her recipe for the ice cream, after which the mix is poured into the inner container.

The paddle assembly is positioned within the inner container, and the lid 104 is applied, causing the paddle assembly to be retained in a centered position in the inner container.

The inner container is then placed in the outer container, and the driving head is now attached to the outer container. The driving head, of course, when lowered into position, becomes disposed with its drive socket 174 in engagement with the neck 114. At the same time, the extension 98 is engaged in the socket 180. The driving head is rotated, as previously described herein, to its locked position shown in FIGURES 1 and 2.

Thereafter, the cord is plugged into an outlet, to begin operation of the motor. After the motor goes into operation, the ice compartment 200 defined between the walls of the outer and inner containers is filled with finely crushed ice and salt is added. In this connection, it will be noted that the ice will extend into contact with all areas of the inner container, extending below the bottom wall 39, as well as in contact with the lid 104 and side wall.

In operation, the paddle assembly will be held against rotation by reason of its being engaged with the stationary bridge element. The outer container, of course, is also held against rotation, but the inner container is turned at a predetermined, relatively slow rate of speed, through the provision of the driving mechanism terminating in the drive cup 168.

It has been found that by reason of the construction illustrated and described, the ice cream will be completely made, in a firm condition, in a minimum of time and with a relatively small amount of ice as compared to home ice cream freezers generally in use today. In a typical arrangement, the average freezing time is from fifteen to twenty minutes, and it has been found that one can visually determine when the ice cream has been completely made, by noting a slowing down of the speed of rotation of the inner container.

When the ice cream is to be removed, the driving head is lifted off, and the cover 104 is removed, providing access to the ice cream. The paddle assembly is lifted out, to facilitate removal of the ice cream from the inner container.

The components can be easily cleaned, as will be understood. The driving head would not be attached in any way, when the device is not in use, so that the outer container, inner container, and paddle assembly can be separately, easily washed.

It may be observed that during the use of the device, should any lubricant tend to run down the center post from the motor, it will, of necessity, be required to pass into the trough 102 of the cup 100. This is by reason of the fact that the outer diameter of the trough is appreciably greater than the diameter of the opening 112 (see FIGURE 4) formed in the lid 104. The lubricant cannot escape the cup, and is effectively confined therein, so as to be prevented from impinging in any way upon the mix.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being understood that the invention comprehends any changes in construction that may be permitted within the scope of the appended claim.

What is claimed is:

In an ice cream freezer assembly which includes a stationary outer container, a rotatable inner container adapted to have ice cream mix therein, the inner container including a bottom wall and a substantially cylindrical side wall, and a paddle assembly mounted within the inner container, that improvement in the paddle assembly which comprises:

(a) a stationary center post;
(b) a frame rigid with and projecting outwardly from the center post;
(c) a lubricant-catching cup on the center post above the frame;
(d) the frame having upstanding side portions extended at opposite sides of the center post with the part of the frame at one side of the center post being offset transversely of the part of the frame disposed at the other side of the center post;
(e) the frame having horizontally disposed bottom portions in closely spaced, parallel relation to the bottom wall of the inner container;
(f) side and bottom lugs carried by the side and bottom portions, respectively, the lugs being formed with bearing recesses;
(g) flaps formed of plastic material, including side and bottom flaps, having beveled outer edges shaped to conform to the side and bottom walls, respectively, of the inner container;
(h) stop lugs on the flaps;
(i) the flaps having projecting fingers engaged in the bearing recesses of the side and bottom lugs, and being arranged for swinging movement therein between extended positions and retracted positions and being engaged by the frame in the extended position such that they are limited from swinging movement beyond the extended position;
(j) the flaps, in their extended positions, being adapted for disposition in wiping contact with the respective walls of the inner container, while being out of contact with the walls in their retracted positions and being limited from movement beyond the last named position by the stop lugs.

References Cited in the file of this patent

UNITED STATES PATENTS

| | | |
|---|---|---|
| 911,348 | Viedt | Feb. 2, 1909 |
| 969,016 | Willmann | Aug. 30, 1910 |
| 990,498 | Pfouts | Apr. 25, 1911 |
| 1,018,505 | Kronenberger | Feb. 27, 1912 |
| 1,458,855 | Sargent | June 12, 1923 |
| 1,649,968 | Morris | Nov. 22, 1927 |
| 1,697,656 | Kracke | Jan. 1, 1929 |
| 1,790,365 | Brennan | Jan. 27, 1931 |
| 1,956,613 | Corn et al. | May 1, 1934 |
| 1,997,035 | Arbuckle | Apr. 9, 1935 |
| 2,082,752 | Lewis et al. | June 1, 1937 |
| 2,181,089 | Kettleborough | Nov. 21, 1939 |
| 2,242,929 | Townsend | May 20, 1941 |
| 2,599,021 | Se Bastian | June 3, 1952 |
| 2,638,329 | Weygand | May 12, 1953 |